J. E. AMBROSE.

Lamps.

No. 5,412. Reissued May 20, 1873.

Witnesses.

J. H. Shumway

A. J. Tibbits

Joshua E. Ambrose

Inventor

By Atty.

John E. Earle

AM. PHOTO-LITHOGRAPHIC CO. N.Y. (OSBORNE'S PROCESS)

UNITED STATES PATENT OFFICE.

JOSHUA E. AMBROSE, OF COLORADO SPRINGS, COLORADO TERRITORY, ASSIGNOR, BY MESNE ASSIGNMENTS, TO SARAH T. AMBROSE, OF SAME PLACE, AND EDWARD MILLER, OF MERIDEN, CONNECTICUT.

IMPROVEMENT IN LAMPS.

Specification forming part of Letters Patent No. 30,381, dated October 16, 1860; reissue No. 5,412, dated May 20, 1873; application filed February 12, 1873.

*To all whom it may concern:*

Be it known that I, JOSHUA E. AMBROSE, of Colorado Springs, in the Territory of Colorado, have invented a new and Improved Lamp; and I do hereby declare the following, when taken in connection with the accompanying drawing and the letters of reference marked thereon, to be a full, clear, and exact description of the same, and which said drawing constitutes part of this specification, and represents, in—

Figure 1:
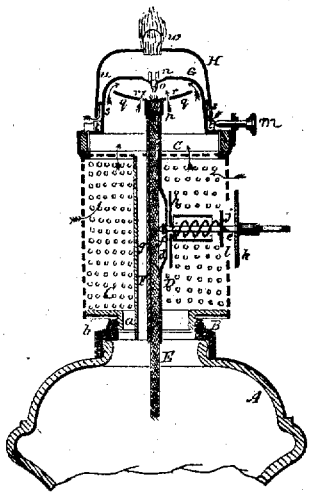
Figure 2:
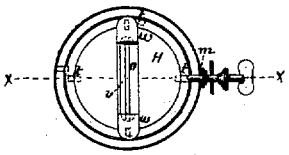
Figure 3:
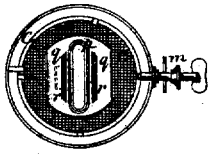
Figure 4:
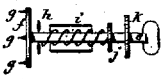

Figure 1, a vertical central section; Fig. 2, a top view; Fig. 3, a top view with the heater detached; and in Fig. 4, a detached plan or top view of the wick-adjuster.

This invention relates to an improvement in that class of burners designed for burning hydrocarbons. In this class of burners the wick-adjuster must necessarily penetrate the wick tube in order to come in contact with the wick. In the use of these burners it is found that the gas which is unavoidably generated within the lamp will escape through the tube around the wick-adjuster and pass off to mingle with the surrounding atmosphere to the discomfort of persons near, if not detrimental to their health, and as this gas is highly inflammable it frequently ignites from the flame of the lamp and often causes explosion. The object of this invention is to combine with the wick tube and adjuster such a means of escape for the gas that it may pass so freely directly to the flame as to be there consumed, and thus prevent its escape around the adjuster; also, the construction of a burner which may be used without a chimney.

The invention consists, first, in combining with the wick tube and adjuster, an auxiliary passage leading directly from the lamp up to within such proximity to the flame that the gas from the lamp, flowing freely through this auxiliary passage, will pass to and be consumed by the flame; second, in the employment of a perforated cap, wick-tube, heaters, and deflecting-plate, combined and arranged as hereinafter described; third, in a wick-adjusting mechanism, arranged so as to admit of the wick being elevated with certainty, and when not in use allow the wick to be loose and free within the tube—that is, without any pressure from the adjuster—to allow the free flow of the oil.

A represents the upper or neck portion of the body of a lamp, provided at its upper end with the usual socket B to receive the cap C, the lower end of the cap being provided with a threaded flange, *a*, to fit the corresponding thread in the socket. The cap *c* is, by preference, of cylindrical form, and constructed from perforated sheet metal, the lower end having a plate, *b*, fitted into it, the said plate being a part of or attached to the flange *a*. The upper end of the cap is covered by a perforated plate, *c*. D, the wick tube, extends vertically from the socket upward, opening both into the lamp and at or near the deflector, in substantially the usual manner. Within the tube the wick E is arranged, and the tube is fitted with an adjuster, here represented as an improved adjuster, to be hereinafter described. An auxiliary tube or passage, F, is formed, the lower end of which communicates with the interior of the body of the lamp, and the upper end opening near the upper end of the wick-tube, so that the gas which is generated within the lamp, instead of passing out through the opening in the tube for the wick-adjuster, as it otherwise would, will pass up through this tube or passage in such proximity to the flame that it is consumed. The termination of this tube is here represented as at the perforated plate *c*, the perforations of the plate being sufficient for the free passage of gas to the flame. On the upper end of the cap *c* there is placed a copper dome-shaped heater, G, which is secured in proper position by a thumb-screw, *m*. This heater is slotted at its upper end, as shown at *n*, and at the center of the slot there is fitted a longitudinal bar, O, the latter dividing the slot *n* into two equal longitudinal parts. The wick tube F extends some distance above the perforated plate *c*, and on its upper end a collar, *p*, is fitted, the said collar having plates *q* projecting from it slightly inclined from a horizontal plane. Between the outer edges of the plates *q* and the collar *p* there are openings *r*. On the outer side of the heater G there are vertical ribs *s*, at the lower ends of which there are projections *t*. These projections *t* serve as bearings for a heater, H, which is similar to G in form. The ribs and projections *t* admit of a space, *u*, being between the two heaters, and the upper end of the heater H is slotted, as shown at *v*, Fig. 2, and has plates *w* extending upward from each end of it and inclined toward each other at an angle of about forty-five degrees. The plates *q* of the collar *p* and the openings *r* cause a draft to ascend directly upward to the flame, and air is also deflected directly against the inner sides of the heater G, and becomes intensely heated, so as to supply the flame with warm oxygen. The bar *o* in the slot *n* of the heater G serves to divide the flame, and prevents it from ascending up through the slot *n* before the carbon is consumed. Between the two heaters G H oxygen passes and becomes highly rarefied, and unites with the carbon in the flame, insuring perfect combustion.

The plates *w* at the ends of the slot *v* of the heater H serve to spread the flame and diminish its height, thereby keeping the flame at the point where the heat is most intense, The flame at the slot *n* in the heater G is merely a gas-generating flame, the illuminating flame having its base at the slot *v* of the heater H.

The wick-tube D at one side—the side opposite that to which the tube F is attached—has an enlarged space or a chamber, *d*, in which the inner end of a horizontal shaft, *e*, passes. This shaft *e* has a horizontal rod, *f*, fitted on it, containing spurs G, the rod and spurs being within the chamber *d*. On the shaft *e* there is placed loosely a metal plate, *h*, the said plate being at the outer side of the chamber *d*, the latter having its side slotted to admit the shaft *e* and rod *f*. On the shaft *e* there is placed a spiral spring, *i*, the inner end of which bears against the plate *h*, the outer end bearing against a plate or step, *j*, which is attached permanently to the shaft *e*. The spring *i*, it will be seen, has a tendency to keep the shaft *e* shoved outward to the extent of this movement, and keep the rod *f* and spurs *g* within the chamber *d* and free from the wick E. On the shaft *e*, and at the outer side of the cap C, there is secured a plate, *k*. The shaft *e* passes through a slot, *l*, in the cap C.

In order to raise or lower the wick E the shaft *e* is pressed inward, and the spurs *g* will penetrate the wick, and by raising or lowering the shaft *e* the wick will be raised or lowered accordingly. The plate *h* covers the slot in the side of the chamber *d*, and prevents the escape of gas or vapor from the wick-tube and chamber *d*; the plate *k* retains the rod *e* in a horizontal position as it is raised and lowered.

I claim as my invention—

1. In combination with the wick-tube and a mechanism for adjusting the wick, an auxiliary tube or passage leading from the lamp upward to conduct the gas from within the lamp to the flame, substantially as set forth.

2. The arrangement of the heaters G H, with a space between them communicating directly with the external air, in connection with the collar *p* and plates *q q*, fitted on the top of the wick tube E, and the perforated cap C, substantially as and for the purpose set forth.

3. The shaft *e* provided with the rod *f* and spurs *g*, which are within the chamber *d* of the wick-tube, in connection with the plates *h j k* and spring *i* on the said shaft, all being arranged to operate as and for the purpose set forth.

JOSHUA E. AMBROSE.

Witnesses:
A. J. TIBBITS,
JOHN E. EARLE.